United States Patent
Sato

(10) Patent No.: US 7,357,385 B2
(45) Date of Patent: Apr. 15, 2008

(54) MACHINING JIG

(75) Inventor: Hirotoshi Sato, Niwa gun (JP)

(73) Assignee: Yamazaki Mazak Corporation, Aichi pref. (JP)

(*) Notice: Subject to any disclaimer, the term of this patent is extended or adjusted under 35 U.S.C. 154(b) by 95 days.

(21) Appl. No.: 11/055,429

(22) Filed: Feb. 11, 2005

(65) Prior Publication Data
US 2005/0179188 A1  Aug. 18, 2005

(30) Foreign Application Priority Data
Feb. 18, 2004 (JP) .............................. 2004-040737

(51) Int. Cl.
*B23Q 3/00* (2006.01)
(52) U.S. Cl. .................................. 269/309; 269/289 R
(58) Field of Classification Search .................. 269/47, 269/308–314, 289 R
See application file for complete search history.

(56) References Cited

U.S. PATENT DOCUMENTS

| | | | |
|---|---|---|---|
| 2,820,640 A | * | 1/1958 | Regan ........................ 279/43.6 |
| 4,828,240 A | | 5/1989 | Longenecker et al. |
| 5,788,225 A | * | 8/1998 | Iwata et al. .................. 269/309 |
| 6,279,888 B1 | * | 8/2001 | Wal, III ........................ 269/37 |
| 2005/0056985 A1 | * | 3/2005 | Iwata .......................... 269/309 |
| 2005/0179188 A1 | * | 8/2005 | Sato ............................ 269/309 |

FOREIGN PATENT DOCUMENTS

| | | |
|---|---|---|
| DE | 102 14 328 A1 | 10/2003 |
| GB | 1 217 741 A | 12/1970 |
| JP | 11-090791 | 6/1999 |

* cited by examiner

*Primary Examiner*—Lee D Wilson
(74) *Attorney, Agent, or Firm*—Renner, Otto, Boisselle & Sklar, LLP

(57) ABSTRACT

The invention provides a standardized machining jig to be used in a machining center for processing various works. A machining jig 1 mounted on an exchange table $T_1$ of a machining center has a jig base 10 and a pallet 20, and the pallet 20 is equipped with a large number of even-pitched through holes. Standard bolts 30 are inserted to the through holes, which are prevented from falling to the floor by a stopper plate 80. Standardized supporting blocks 42, 43 and positioning blocks 50 are fixed to the pallet 20 via bolts 30. A work 100 is fixed to the supporting blocks and the positioning blocks. The bolts 30 are manipulated via a bolt runner 60 attached to a robot arm.

6 Claims, 11 Drawing Sheets

B-B CROSS-SECTION

MACHINING JIG

The present application is based on and claims priority of Japanese patent application No. 2004-040737 filed on Feb. 18, 2004, the entire contents of which are hereby incorporated by reference.

BACKGROUND OF THE INVENTION

1. Field of the Invention

The present invention relates to a machining jig for attaching a work, which is used in a machining center functioning as a multitasking machine.

2. Description of the Related Art

According to the prior art machining jig for a machining center, all the jig components are assembled to the pallet during use and during storage. Therefore, if the variation of the works is increased, the number of pallets with jigs is increased along therewith, taking up storage space and requiring a great number of management steps. Moreover, since normally it is economically impossible to store all the pallets equipped with jigs within an EMS operation system, manpower was required to prepare pallets with jigs that are used less frequently, which was an obstacle to the complete automation of the system.

Japanese Patent Application Laid-Open No. 11-90791 (patent document 1) discloses a flexible machining device using a universal pallet.

SUMMARY OF THE INVENTION

The machining jig according to the present invention is composed of a pallet having a number of bolts, and a standardized jig accommodating member attached to the pallet, wherein by assembling the standardized jig accommodating members according to the variation of the work, it aims at reducing the number of dedicated machining jigs.

The machining jig according to the present invention mounted on a table of a multitasking machine for supporting a work comprises a jig base having an opening formed to a circumference thereof and a round hole at an upper portion thereof, and a disk-shaped pallet being inserted and fixed to the round hole of the jig base. The pallet comprises even-pitched bolt-inserting through holes, a standard bolt inserted to the through hole, and a stopper plate for preventing the bolt from falling.

Further, the machining jig comprises a supporting block fixed to the pallet via the standard bolt for supporting the work, and the supporting block of the machining jig comprises two screw holes to which are engaged the standard bolts inserted to the pallet, and a single through hole through which passes the bolt engaged to the work.

Moreover, the machining jig comprises a positioning block fixed to the pallet via the standard bolt and having a pin for positioning the work.

The jigs that are used frequently are stored in their assembled states as jig plates, and the jigs that are used less frequently are assembled when necessary by a worker into a jig plate and prepared in a storage. This method enables the number of stored variations of plates to be reduced and both the storage space and the steps required for storage to be reduced greatly. Since the attachment of the work to the jig is realized by fastening the work onto the jig from a bottom surface using a bolt, the work is free from any deflection caused by clamping, and thus, highly accurate machining is made possible. Furthermore, since there are no jig components attached to the outer side of the work, no interference occurs with the jig. The present invention can be easily automated using robots.

DETAILED DESCRIPTION OF THE PREFERRED EMBODIMENTS

Figure 1:
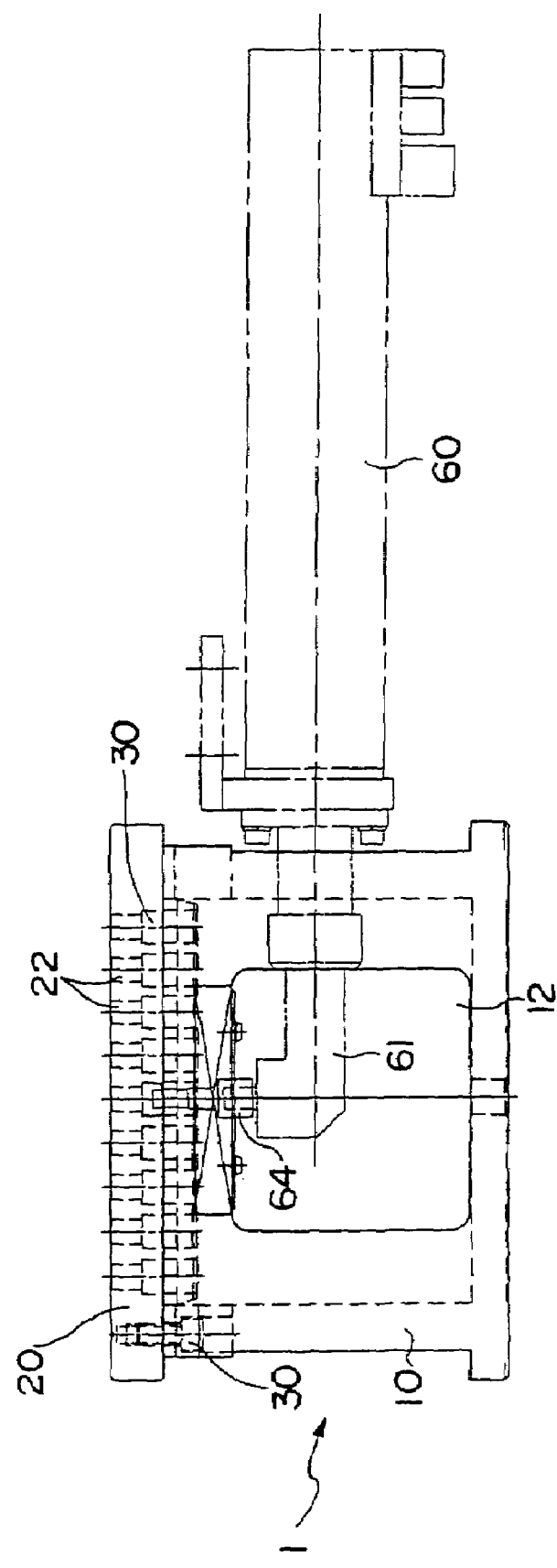
FIG. 1 is a front view of a machining jig.
Figure 2:
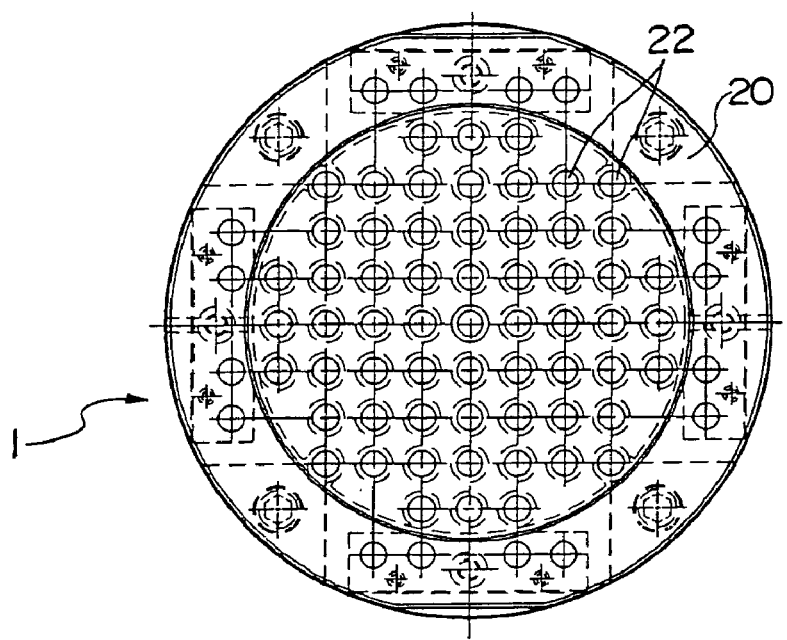
FIG. 2 is a plan view of the machining jig.

FIG. 1 is a front view of a jig base and a pallet according to the machining jig of the present invention, and FIG. 2 is a plan view thereof.

The machining jig, the whole of which being denoted by reference number 1, is composed of a jig base 10 and a pallet 20, and the pallet 20 is fixed to the jig base 10 by bolts 30.

A large number of bolt holes 22 are formed to the pallet 20 at predetermined intervals, and each bolt hole has a bolt 30 inserted upward thereto. On the back side of the pallet 20, there is attached a plate with holes for preventing the bolts 30 screwed onto the bolt holes 22 from falling.

The jig base 10 has openings 12 formed on four sides thereof, and through these openings 12, a head 61 of a bolt runner 60 attached to a robot arm is inserted to manipulate the bolts 30 within the pallet 20.

Figure 3:
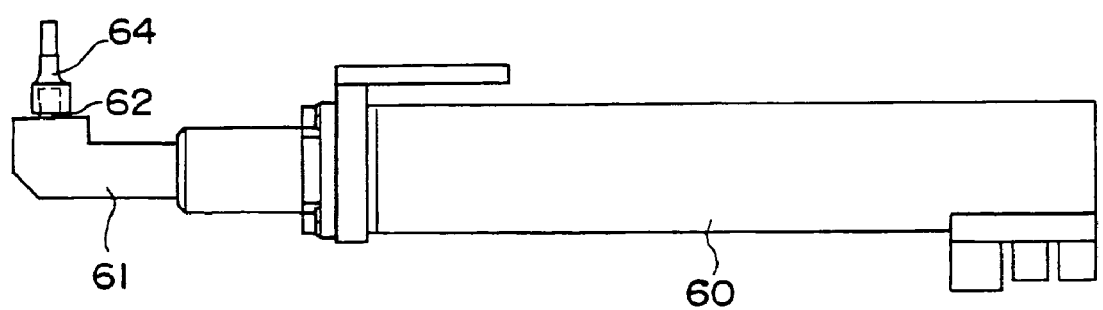
FIG. 3 is a front view of a bolt runner.
Figure 4:
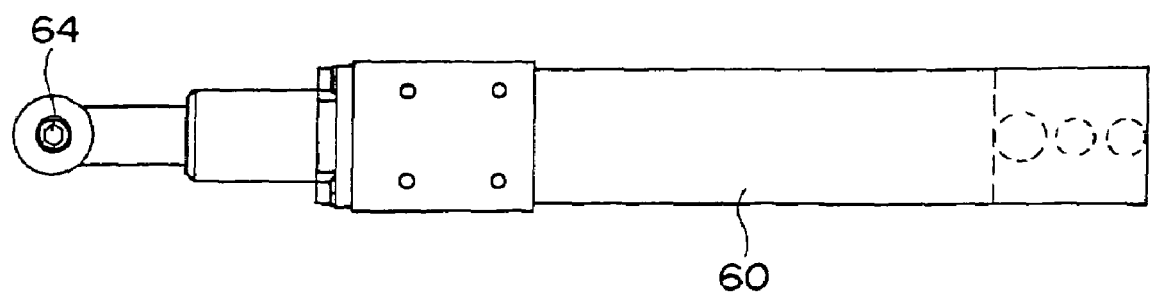
FIG. 4 is a plan view of the bolt runner.

FIG. 3 is a front view of the bolt runner, and FIG. 4 is a plan view thereof.

The bolt runner 60 has a drive device disposed in the interior thereof for pivoting a drive shaft 62 attached to the head 61 thereof. The direction of rotation of the drive shaft 62 can be switched arbitrarily.

A wrench member 64 is attached to the tip of the drive shaft 62. The wrench member 64 has a hexagonal wrench head which fits to a hexagonal bore formed to the bolt 30. In this state, the wrench member 64 is driven to engage and/or disengage the bolt.

Figure 5:
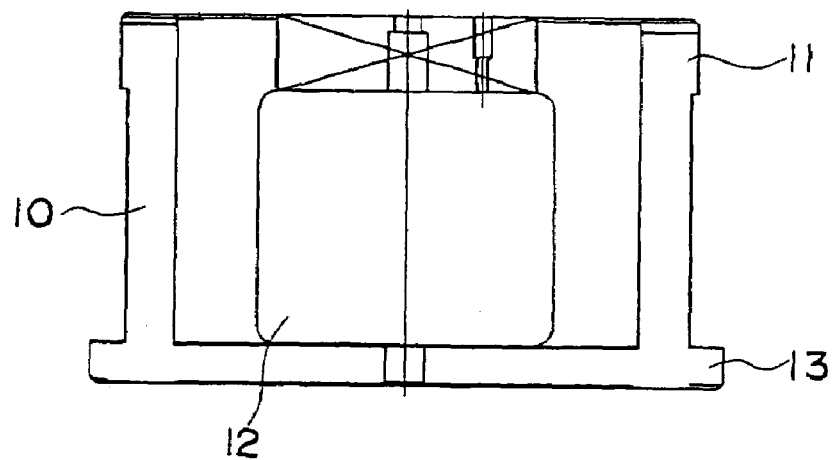
FIG. 5 is a front view of a jig base.
Figure 6:
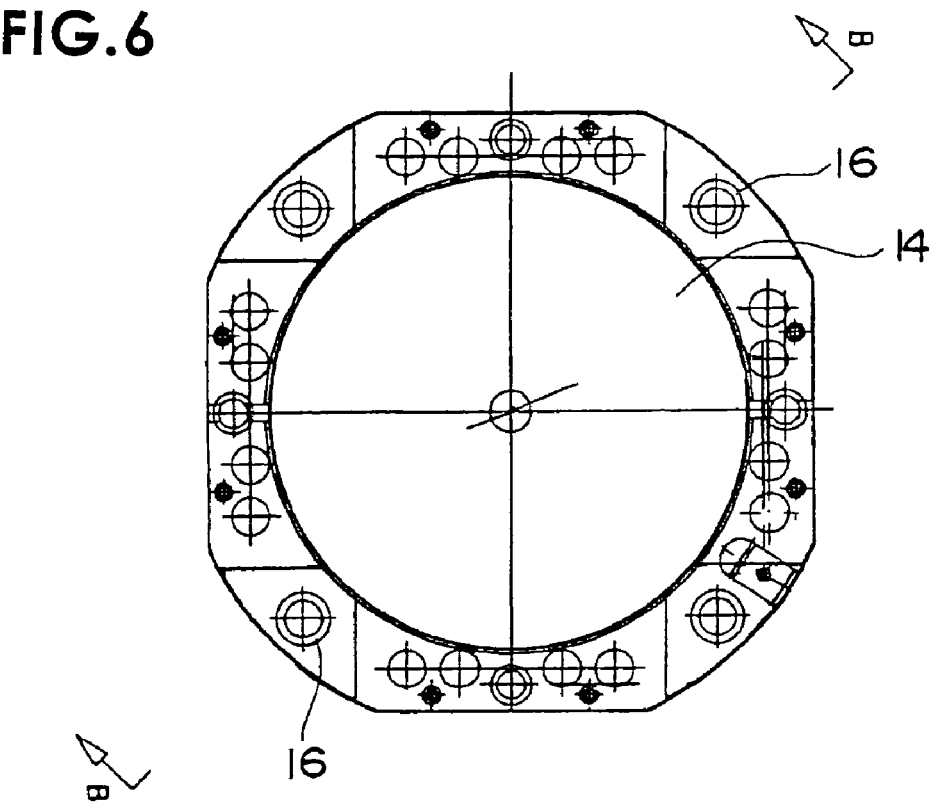
FIG. 6 is a plan view of the jig base.
Figure 7:
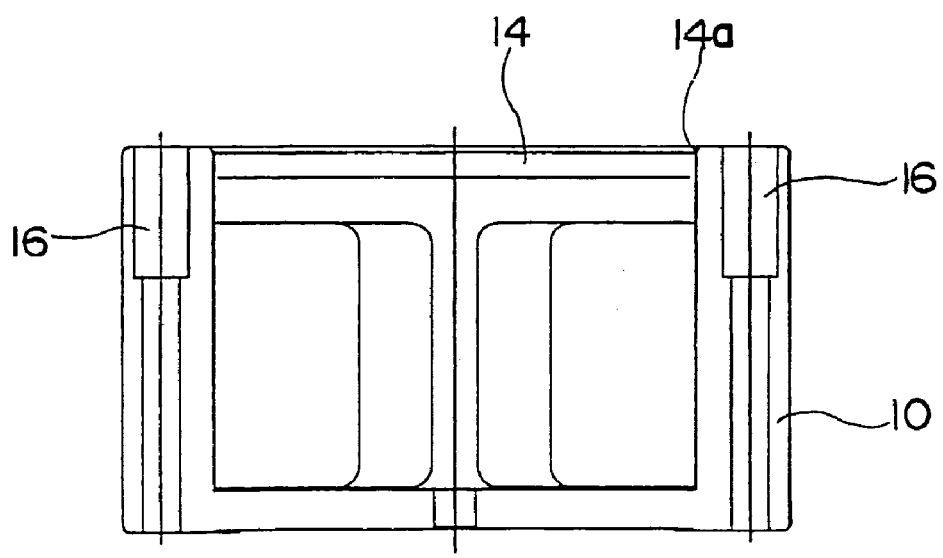
FIG. 7 is a B-B cross-section of FIG. 6.

FIG. 5 is a front view of the jig base, FIG. 6 is a plan vie thereof, and FIG. 7 is a cross-sectional view taken at line B-B of FIG. 6.

The jig base 10 is shaped to have flat surfaces formed to the outer circumference of a cylindrically shaped member, and on an upper flange portion 11, a round hole 14 is formed to receive a disk-shaped pallet. A chamfered portion 14a is formed to the inlet area of the round hole 14 for receiving the pallet smoothly.

A lower flange portion 13 is disk-shaped, and mounted on a table of the machining center. The jig base 10 has four through-holes 16, and bolts are inserted to these holes 16 to fix the jig base 10 onto the upper surface of the table of the machining center.

Figure 8:
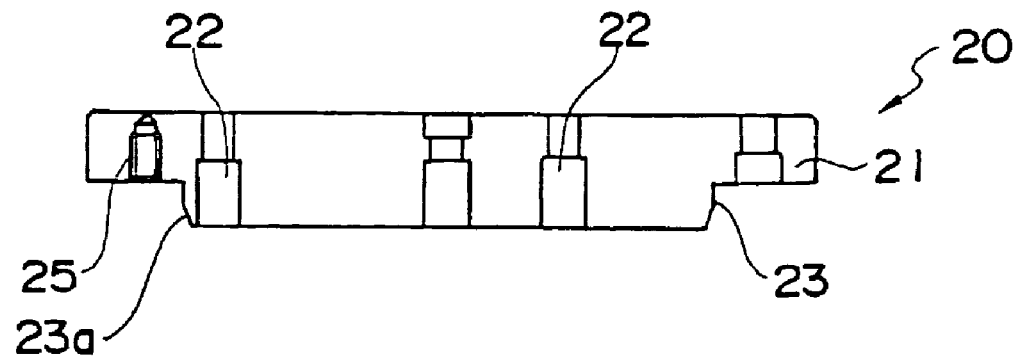
FIG. 8 is a cross-sectional front view of a pallet.
Figure 9:
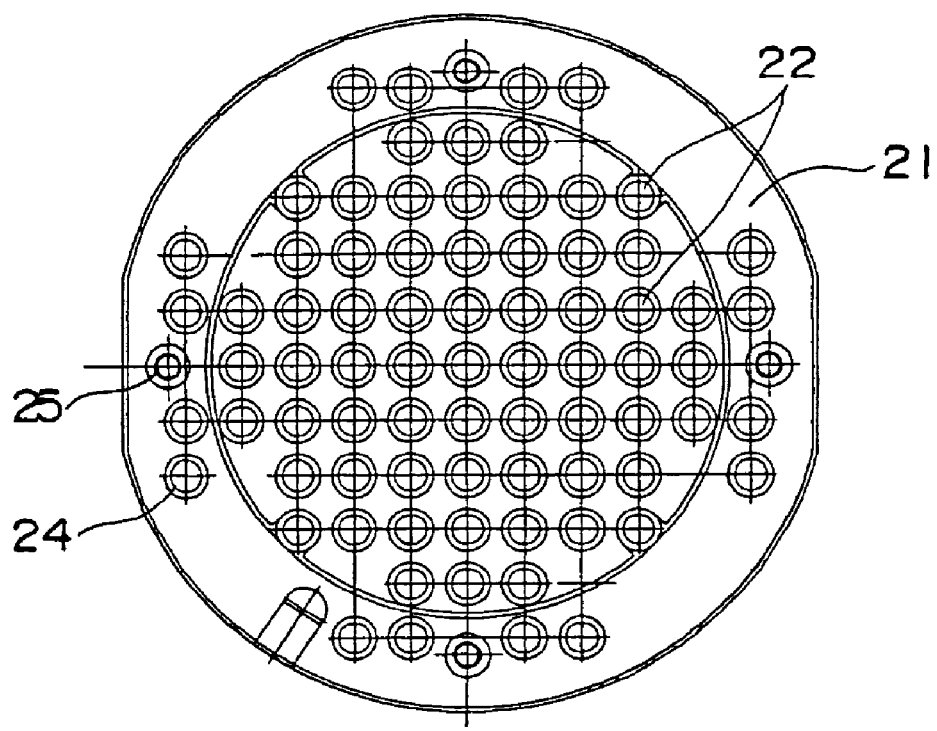
FIG. 9 is an upper view of the pallet.
Figure 10:
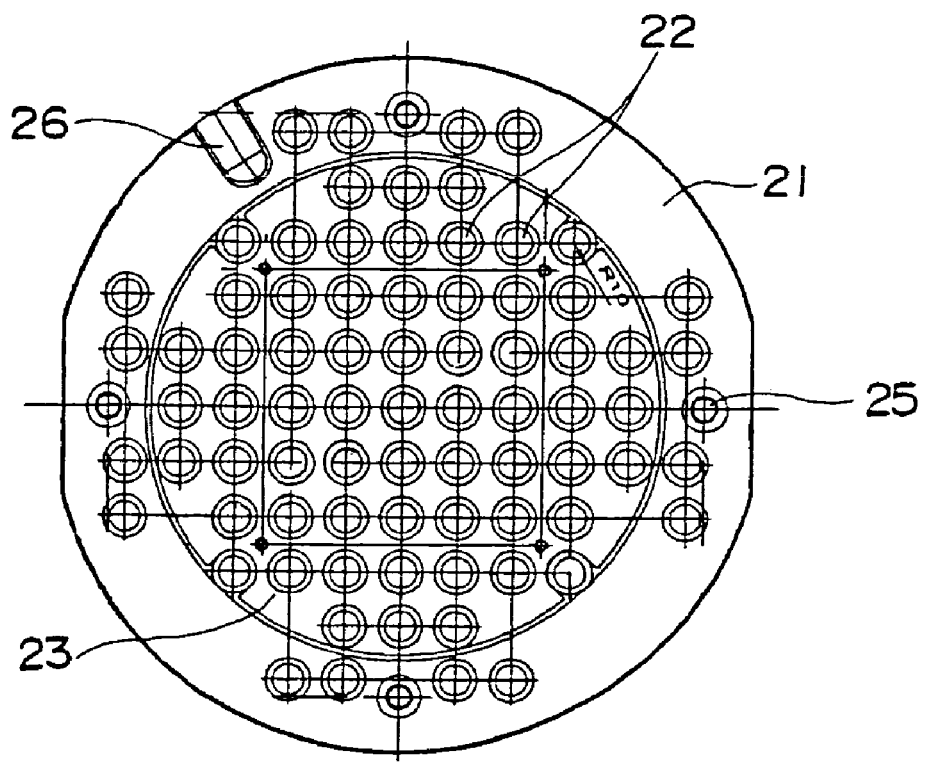
FIG. 10 is a bottom view of the pallet.

FIG. 8 is a cross-sectional front view of the pallet 20, FIG. 9 is an upper view thereof, and FIG. 10 is a lower view thereof.

The pallet 20 has a flange portion 21 and a cylindrical portion 23 formed integrally to the lower area of the flange portion 21, and the cylindrical portion 23 is inserted to the round hole 14 of the jig base 10. A tapered portion 23a is formed to the end of the cylindrical portion 23, which enables the pallet to be inserted smoothly to the round hole 14 of the jig base 10.

A large number of even-pitched bolt-inserting through holes 22 are formed on the cylindrical portion 23. Moreover, the flange portion 21 also has bolt-inserting through holes 24 and bolt holes 25 with screw threads. Furthermore, a groove 26 with a bottom is formed on the back surface of the flange portion 21.

Figure 11:
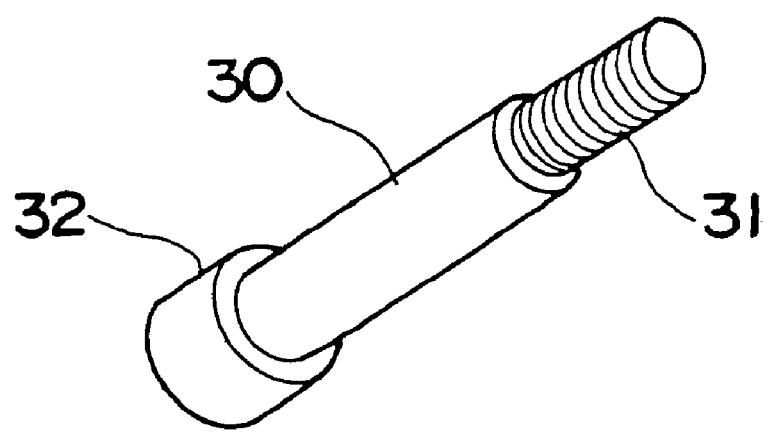
FIG. 11 is a perspective view of a standard bolt.

FIG. 11 is a perspective view showing a standard bolt to be engaged to the through holes 22 or the like on the pallet.

The standard bolt 30 has a predetermined screw portion 31 formed to the end of a cylindrical main body, and on a head portion of the main body is formed a cylindrical head 32.

At the center area of the head 32 is formed a hexagonal hole (not shown) for receiving wrenches. A necessary number of standard bolts 30 of various sizes are prepared.

Figure 12:
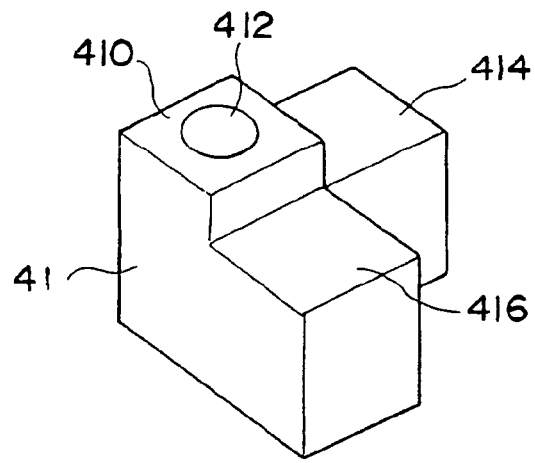
FIG. 12 is an explanatory view of a supporting block.
Figure 12:
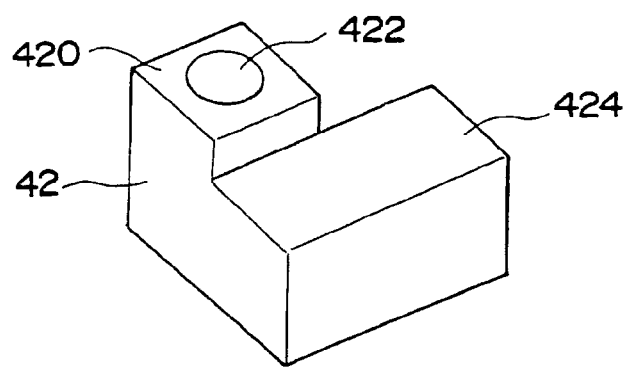
Figure 12:
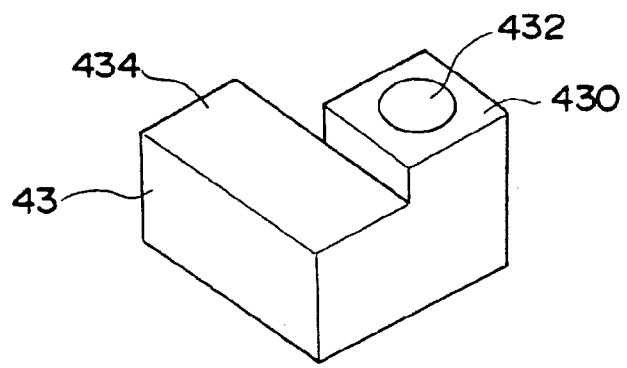
Figure 12:
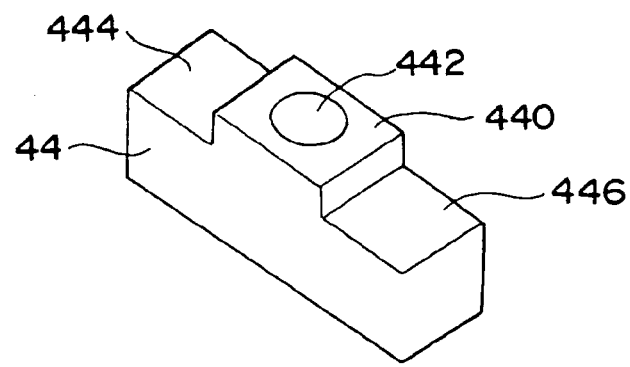

FIG. 12 is an explanatory view showing the form of a typical block for supporting a work.

According to the present embodiment, four types of supporting blocks 41, 42, 43 and 44 are used.

A first supporting block 41 has a prismatic main body 410, and two attachment portions 414 and 416 extend orthogonally from the main body 410.

At the center of the main body 410 is formed a bolt through hole 412. The upper surface of the main body 410 functions as a surface for supporting a work. On the back side of the two attachment portions 414 and 416 are formed screw holes (not shown) that engage with the screw portion of the bolt. The pitch between the two screw holes is designed to correspond to the diagonal pitch of the bolt-inserting through holes 22 formed to the pallet 20.

A second supporting block 42 has a prismatic main body 420 and an attachment portion 424 formed adjacent to the main body. The main body 420 has a bolt through hole 422. The height of the main body 420 is designed to correspond to the height common to all the supporting blocks. On the back side of the attachment portion 424 are formed two screw holes (not shown). The pitch between the two screw holes is designed to correspond to the pitch between adjacent bolt-inserting through holes 22 formed to the pallet 20.

A third supporting block 43 has a prismatic main body 430 and an attachment portion 434 formed adjacent to the main body. The main body 430 has a bolt through hole 432. The height of the main body 430 is designed to correspond to the height common to all the supporting blocks. On the back side of the attachment portion 434 are formed two screw holes (not shown). The pitch between the two screw holes is designed to correspond to the pitch between two adjacent bolt-inserting through holes 22 formed to the pallet 20.

A fourth supporting block 44 has a prismatic main body 440 and attachment portions 444 and 446 formed on both sides of the main body. The main body 440 has a bolt through hole 442. The height of the main body 440 is designed to correspond to the height common to all the supporting blocks. On the back side of the attachment portions 444 and 446 are formed two screw holes (not shown). The pitch between the two screw holes is designed to correspond to the pitch between two bolt-inserting through holes 22 formed to the pallet 20.

Figure 13:
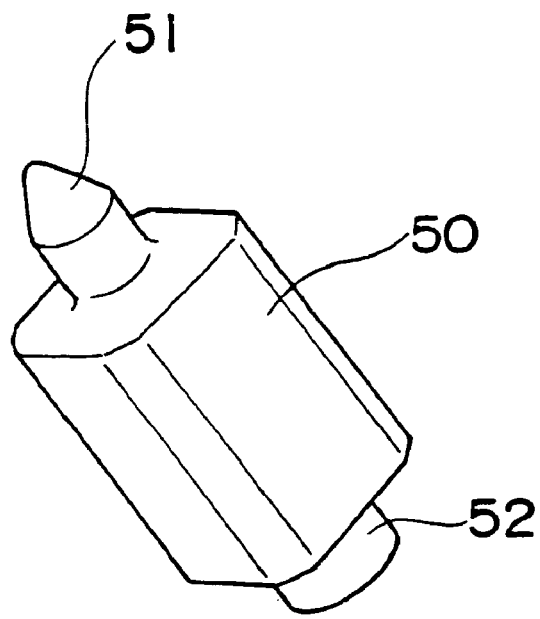
FIG. 13 is an explanatory view of a positioning block.

FIG. 13 is an explanatory view of a positioning block prepared for positioning a work on a predetermined position on the pallet 20.

The positioning block 50 has a prismatic body and a positioning pin 51 disposed on the front end of the body. The positioning pin 51 has a diamond-shaped pointed tapered face.

The rear end of the positioning block is formed to have a cylindrical boss portion 52. The boss 52 is inserted to a bolt hole 22 or 24 formed on the surface of the pallet 20 which also serve as positioning holes. A screw hole is formed to the boss portion 52, through which it can be fixed to the pallet 20 using a standard bolt 30.

Figure 14:
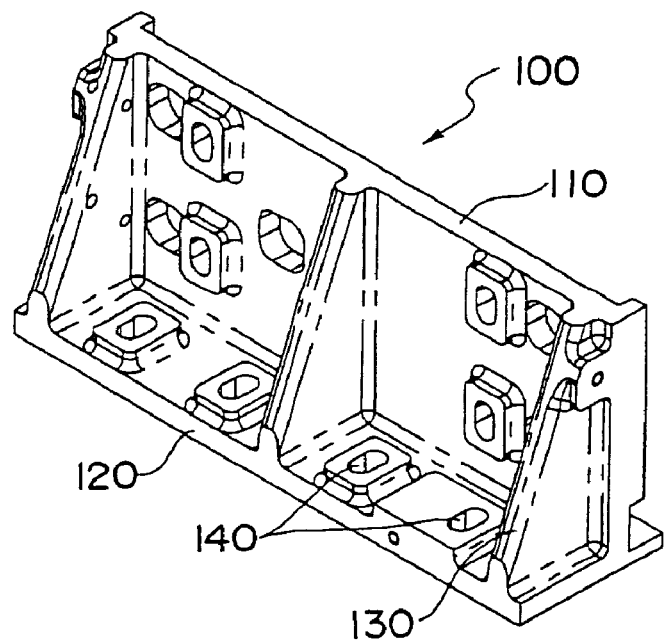
FIG. 14 is an explanatory view of a work.

FIG. 14 is a perspective view showing an example of a work processed in the machining center using the machining jig according to the present invention.

A work 100 is a bracket having a structure where two orthogonal plate members 110 and 120 are coupled by triangular flanges 130. On the inner side of the plate members 110 and 120 are formed projections 140 having through holes and so on.

Figure 15:
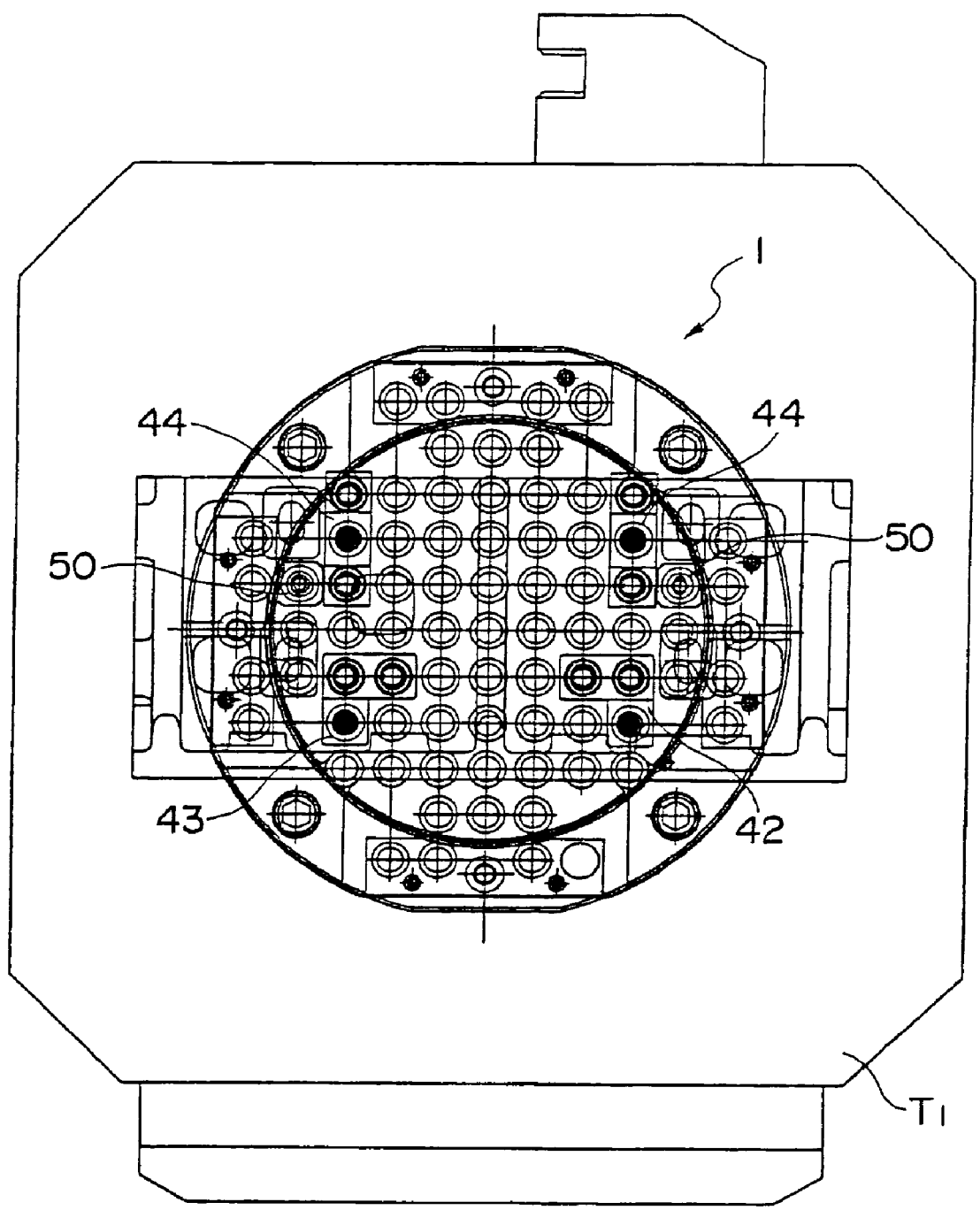
FIG. 15 is a plan view of an exchange table.
Figure 16:
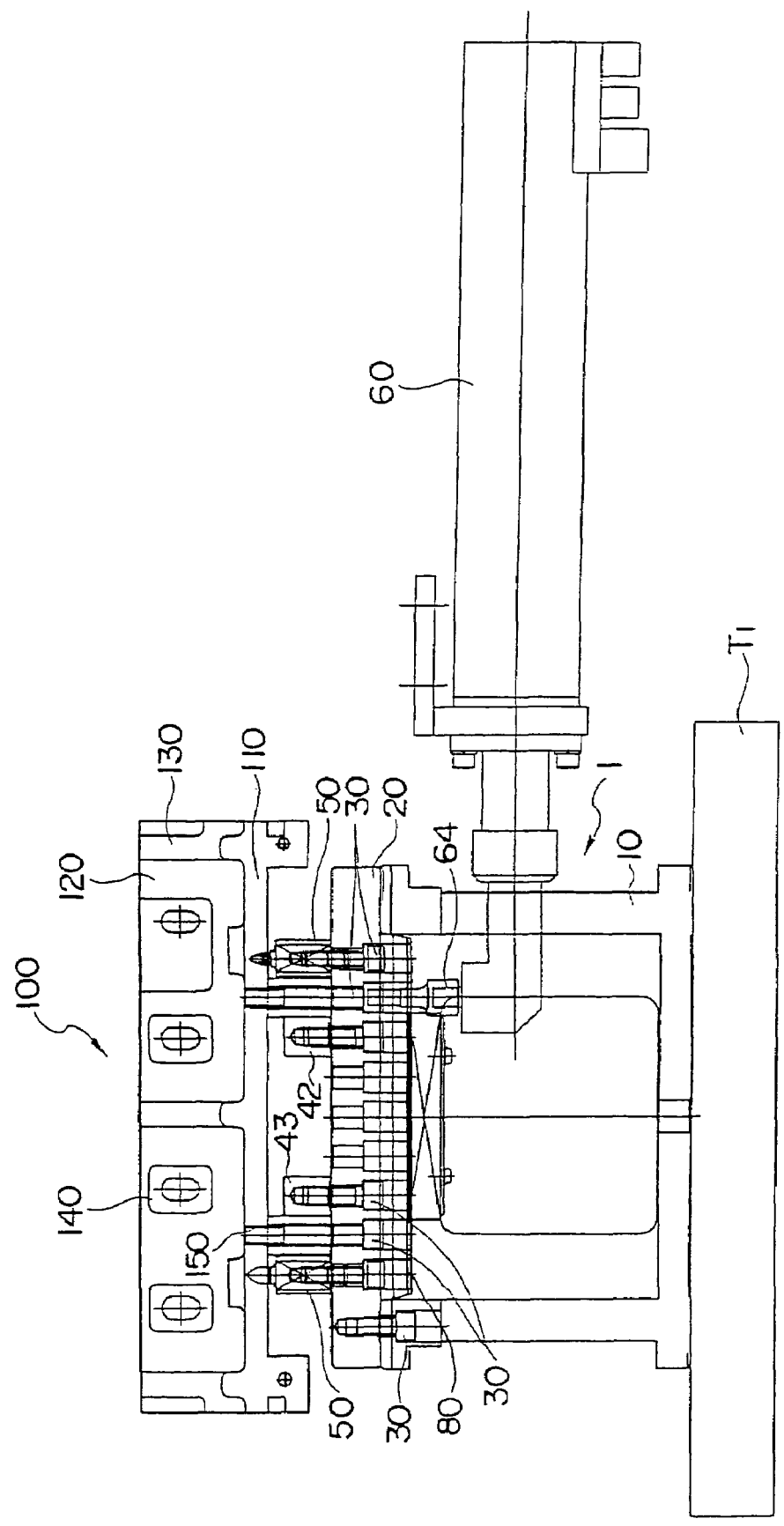
FIG. 16 is a front view of the exchange table.
Figure 17:
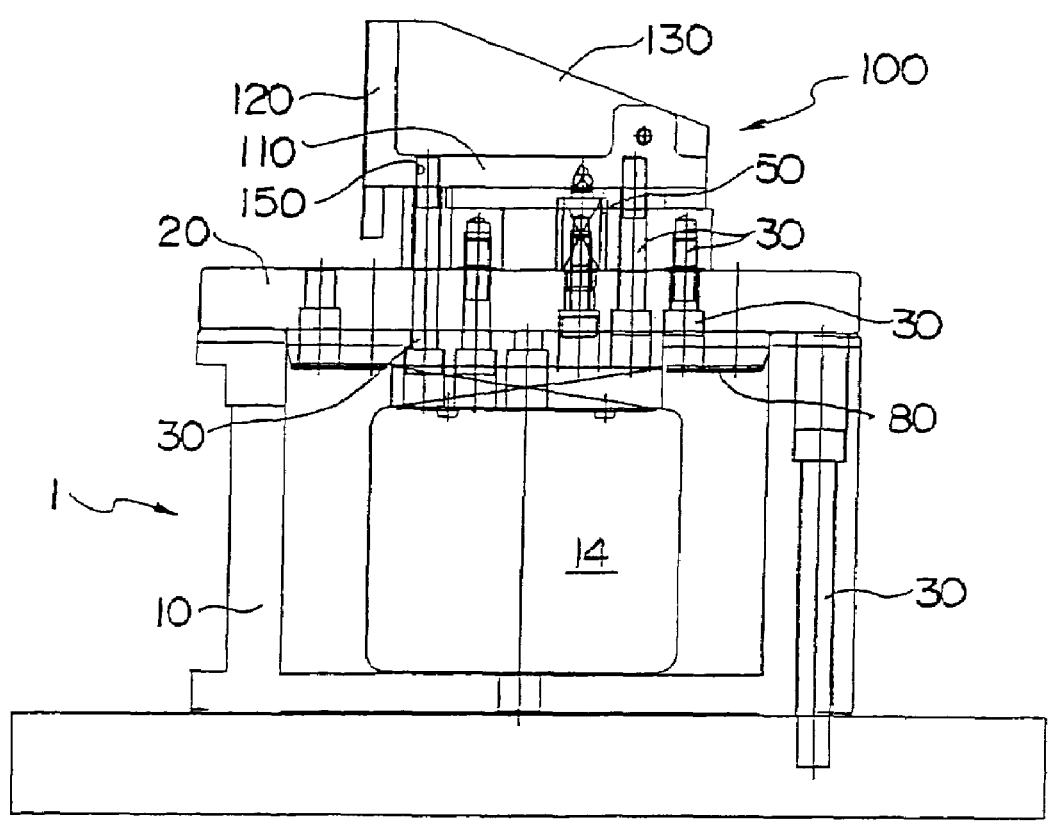
FIG. 17 is a right side view of the exchange table.

FIG. 15 is a plan view of an exchange table of the machining center on which the machining jig according to the present invention is mounted, FIG. 16 is a front view thereof, and FIG. 17 is a right side view thereof.

The machining jig 1 having the jig base 10 and the pallet 20 connected integrally together is fixed to the surface of an exchange table $T_1$ using bolts 30.

Two positioning blocks 50, 50 are fixed to the pallet 20 via bolts 30. The bolt tightening operation is performed automatically by rotating the wrench 64 on the bolt runner 60 attached to the robot arm.

Next, standard supporting blocks for supporting the work 100 are fixed to the pallet 20. In the example of this work 100, a single second supporting block 42, a single third supporting block 43 and two fourth supporting blocks 44 are used, wherein the blocks are fixed to the pallet 20 via standard bolts 30.

In order to prevent unused standard bolts 30 from falling from the pallet 20, a stopper plate 80 having holes for wrenches to pass therethrough is attached to the back side of the pallet 20.

The work 100 is securely fixed to the supporting blocks via bolts 30 using screw holes 150 formed in advance to the work 100.

By means described above, the work 100 arranged on the table of the machining center is subjected to necessary processing in the machining center.

What is claimed is:

1. A machining jig mounted on a table of a multitasking machine for supporting a work, the machining jig comprising:
    a jig base having an opening formed in a side circumference thereof and a round hole in an upper portion thereof;
    a disk-shaped pallet being inserted and fixed to the round hole of the jig base, wherein the pallet comprises even-pitched bolt-inserting through holes, a standard bolt inserted to the through hole, and a stopper plate for preventing the bolt from falling; and
    a supporting block fixed to the pallet via the standard bolt for supporting the work.

2. The machining jig according to claim 1, wherein the supporting block of the machining jig comprises two screw holes to which are engaged the standard bolts inserted to the pallet, and a single through hole through which passes the bolt engaged to the work.

3. A machining jig mounted on a table of a multitasking machine for supporting a work, the machining jig comprising;
   a jig base having an opening formed in a side circumference thereof and a round hole in an upper portion thereof;
   a disk-shaped pallet being inserted and fixed to the round hole of the jig base, wherein the pallet comprises even-pitched bolt-inserting through holes, a standard bolt inserted to the through hole, and a stopper plate for preventing the bolt from falling; and
   a positioning block fixed to the pallet via the standard bolt and having a pin for positioning the work.

4. A machining jig mounted on a table of a multitasking machine for supporting a work, the machining jig comprising:
   a jig base, comprising:
      a lower flange portion mounted on the table of the multitasking machine,
      an upper flange portion parallel to and spaced apart from the lower flange portion,
      a side portion attached to the upper flange portion and the lower flange portion at respective ends and maintaining the upper flange portion and the lower flange portion in spaced apart relationship,
      a hole within the upper flange portion sized to receive a disk-shaped pallet and
      at least one opening in the side portion providing access into a volume defined by the upper flange portion, the lower flange portion and the side portion;
   the disk-shaped pallet inserted and fixed to the round hole of the of the upper flange portion, the disk-shaped pallet comprising:
      even-pitched bolt-inserting through holes, and
      a standard bolt inserted in each of the through holes, each bolt extending upwardly through the respective through hole with the head of each bolt facing downward towards the lower flange portion; and
      a stopper plate attached to a side of the disk-shaped pallet facing the lower flange portion, the stopper place preventing each of the bolts from falling downward from the through holes, and including holes aligned with the head of each bolt.

5. The machining jig of claim 4 in combination with a bolt runner attached to a robotic arm, the bolt runner including a drive head with a drive shaft for engaging and rotating the head of each bolt, and wherein the at least one opening in the side portion enables the robotic arm to insert the drive head of the bolt runner therethrough into the volume defined by the upper flange portion, the lower flange portion and the side portion, and to drive selectively the head of each bolt through a corresponding hole in the stopper plate.

6. A method of using a machining jig of claim 4, comprising:
   using a robotic arm to insert a drive head of a bolt runner through the at least one opening in the side portion, and
   selectively engaging the head of each bolt with the drive head through a corresponding hole in the stopper plate to secure/unsecure a workpiece, supporting block or positioning block in relation to the disk-shaped pallet.

* * * * *